Feb. 1, 1949.  F. H. SCHNEIDER  2,460,538
DRAFT REGULATOR

Filed March 14, 1945  2 Sheets-Sheet 1

INVENTOR
Frank H. Schneider
BY
C. Yardley Chittick
ATTORNEY

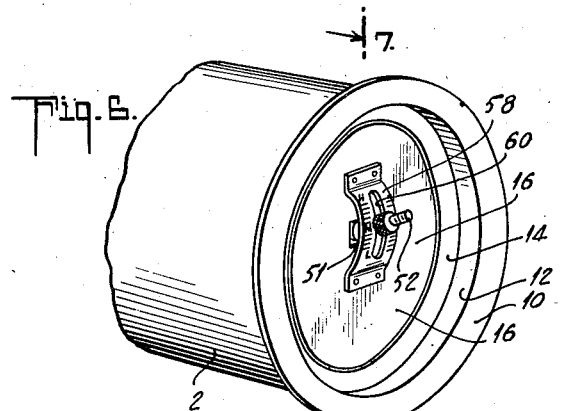
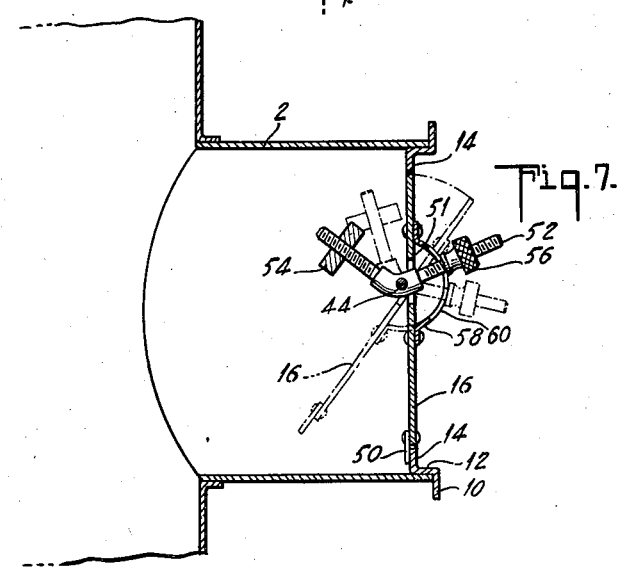
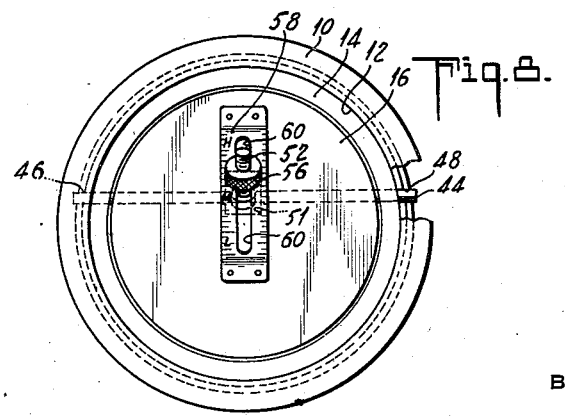

Patented Feb. 1, 1949

2,460,538

UNITED STATES PATENT OFFICE 2,460,538

DRAFT REGULATOR

Frank H. Schneider, Gardner, Mass., assignor to Florence Stove Company, Gardner, Mass., a corporation of Massachusetts Application March 14, 1945, Serial No. 582,764

5 Claims. (Cl. 236—45)

This invention relates to draft regulators, and is particularly concerned with a draft regulator which will be relatively inexpensive, accurate in operation, and capable of sensitive adjustment.

The draft regulator disclosed herein may be used with any type of furnace, but it has been found particularly successful in use with range oil burners, pot burners, and other oil burners which operate under low and sensitive draft conditions.

Provision has been made in the present invention for very accurate adjustment, as small differences in draft conditions result in materially different degrees of operating efficiency.

These and other objects of the invention will become more apparent as the description proceeds with the aid of the accompanying drawings, in which Fig. 1 is a perspective view of one species of the invention.

Fig. 6 is a perspective view of another species of the invention.

Fig. 7 is a vertical section on the line 7—7 of Fig. 6.

Fig. 8 is a front elevation of the construction shown in Figs. 6 and 7.

Since the chimney pressures are only slightly lower than atmospheric, it is essential that the regulator be sensitive to small pressure changes, so that sufficient additional outside air may be quickly admitted to the chimney to maintain the draft conditions substantially constant.

The construction utilized in the present invention results in proper sensitivity and likewise facilitates the adjustment of the regulator so as to operate with the best possible results.

Figure 1:
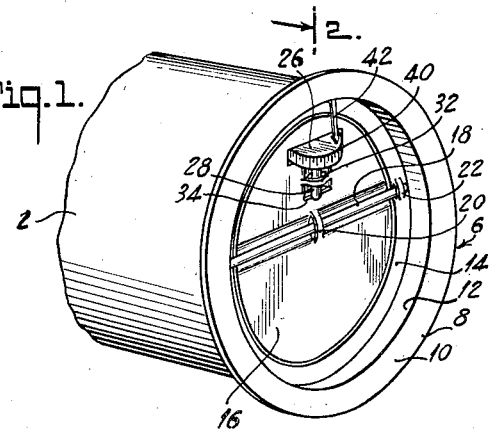
Figure 2:
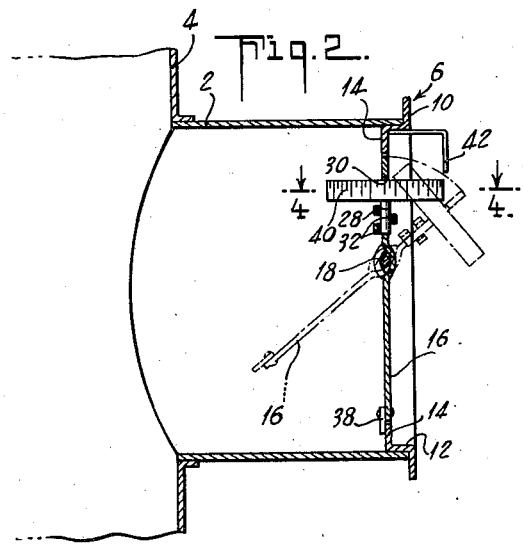
Fig. 2 is a vertical section on the line 2—2 of Fig. 1.

Referring to Figs. 1 and 2, the draft regulator is shown connected to a short section of horizontal pipe 2, which leads into the chimney 4. The draft regulator may be constructed as an individual unit, generally referred to as 6, and which is adapted to be inserted into the end of pipe 2, as shown in Fig. 2.

The regulator itself is constructed of an annular member 8, which consists of a vertical flange 10, a circumferential shoulder 12, and an inner flange 14. The inner flange 14 supports a disc or baffle 16, which is pivoted and weighted in such manner that it may open to a greater or less degree, depending upon the pressures that are developed within the chimney 4.

The baffle 16 is supported by a shaft 18, which may be attached to the face of the disc in any convenient manner. The method shown utilizes a strap 20 punched from the central area of the baffle 16 arching forwardly a sufficient distance to permit the insertion of shaft 18. The entire width of the baffle has been creased slightly to the rear, so that shaft 18, as it rests against the baffle, is in vertical alignment with the plane of the baffle. Shaft 18 is located above the middle of baffle 16, so that the baffle hangs vertically. Similarly, in flange 14, straps 22 and 24 have been struck outwardly so that the ends of shaft 18 may be inserted therein. By careful manufacture, the clearances between shaft 18 and straps 22 and 24 can be arranged so that the pivoting action is very free, that is, there will be such limited friction that baffle 16 will rotate upon the application of a very small pressure.

Figure 5:
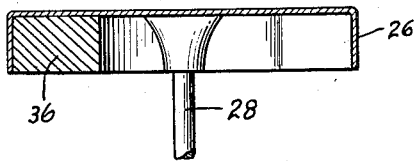
Fig. 5 is a section on the line 5—5 of Fig. 4.

To the upper part of the baffle is affixed the counterbalancing and adjusting mechanism. This consists of a small horizontal disc 26 mounted on a vertical shaft 28, as shown in Fig. 5. In order to accommodate adjusting disc 26 in the upper part of baffle 16, a transverse slot 30 is provided, with its dimensions only slightly greater than the cross section of disc 26. Disc 26 is supported in position in slot 30 by the vertical shaft 28, which in turn is maintained on the upper part of baffle 16 by strap 32 and the bearing surface 34. Frictional engagement between strap 32 and shaft 28 is sufficient to hold disc 26 against free rotation, but it is not so tight as to prevent rotation by hand. Shaft 28 is located substantially in the plane of baffle 16, as can be seen in Fig. 2.

Figure 4:
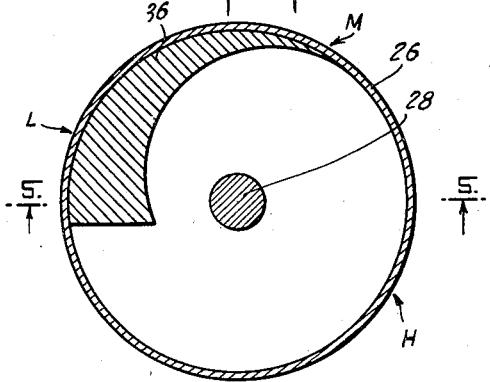
Fig. 4 is a horizontal section on the line 4—4 of Fig. 2.

On the under side of disc 26 is secured a weight 36 of changing contour, as can be seen in Fig. 4. It will be obvious that as disc 26 is rotated, the location of the center of gravity of disc 26 with respect to the vertical plane of baffle 16 may be varied.

When the center of gravity of disc 26 is placed in the plane of baffle 16, the baffle will remain in vertical position, as the weight of that part of the baffle below shaft 18 slightly exceeds the combined weight of that part of the baffle above shaft 18 plus the weight of the adjusting disc 26. When the center of gravity is to the rear of the baffle, the latter will tend to rotate counterclockwise, as seen in Fig. 2, but when the center of gravity is in front of the baffle, rotation will be clockwise. However, the baffle is intended to rotate in one direction only, namely clockwise, as shown in Fig. 2, to admit air to the chimney. To prevent motion in the other direction, should the chimney pressure exceed atmospheric, a small finger 38 is attached to the bottom of the baffle to engage the inside of flange 14.

For any given setting of the adjusting disc, the baffle will swing open an amount varying with the negative pressure in the chimney. The greater the negative pressure in the chimney, the greater the extent of the opening of the baffle for a selected disc setting.

If, in a given installation, it is found necessary to decrease the amount of air admitted through the regulator in order to secure suitable combustion in the burner, such result may be achieved by rotating the adjusting disc to move the center of gravity to the rear of the plane of the baffle. When this is done, it is obvious that it will take a greater negative pressure in the chimney to swing the baffle open to the same extent as occurred at the previous setting.

Thus, the amount of air entering the chimney through the regulator may be easily controlled with the result that the negative pressure or draft may likewise be controlled.

Figure 3:
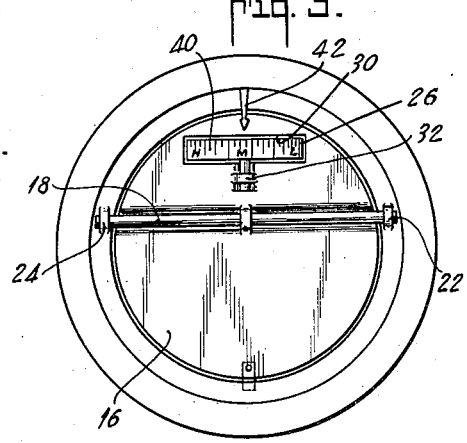
Fig. 3 is a front elevation of the construction shown in Figs. 1 and 2.

In order that the operator may quickly set the regulator to meet particular draft conditions or to duplicate a previous setting, disc 26 is suitably marked about its circumference, as indicated at 40 in Figs. 1, 2 and 3, and additional points of reference H, M, and L, meaning high, medium, and low, may be included, as shown in Figs. 3 and 4. A pointer 42 depends from flange 10, with its end in proximity to the circumference of adjusting disc 26. The desired indication on disc 26 may be brought in alignment with the pointer 42, so that the proper draft conditions may be obtained.

When the baffle is in vertical position, the clearance between the perimeter of the baffle and the interior circumference of flange 14 is small, and the clearance between slot 30 and disc 26 is likewise limited, thereby preventing the entrance of any appreciable amount of air, so long as the baffle remains in closed position. The construction of disc 26 permits an infinite number of draft adjustments which may be quickly and accurately made.

A second form of the invention is shown in Figs. 6, 7, and 8. In this construction the supporting flange that is attached to the pipe 2 is the same as that shown in Figs. 1, 2, and 3, and, likewise, baffle 16 fits closely within the confines of flange 14. The difference resides in the construction of the adjustable weight which is utilized to control the opening of the baffle under varying pressure conditions in the chimney.

The adjustable weight construction shown in Figs. 6, 7, and 8 consists of a shaft 44 which may be attached to baffle 16 in the same manner as shaft 18 is attached in Figs. 1, 2, and 3, or it may be soldered, welded, or otherwise secured to the baffle in the position shown in Figs. 7 and 8. The ends of shaft 44 pass through apertures 46 and 48 in opposite sides of the pipe 2, thereby providing a bearing surface which permits the baffle 16 to rotate easily.

A stop 50 at the bottom of the baffle, by engagement with flange 14, will prevent conterclockwise rotation of the baffle as viewed in Fig. 7.

A small hole 51 is located in the baffle in front of shaft 44. Pivoted on shaft 44 and extending through hole 51 is a lever 52 threaded at both ends and capable of limited rotation about shaft 44. A weight 54 having a screw-threaded hole through its center is threaded upon the rear end of lever 52, while a thumb screw 56 is threaded upon the outer end of lever 52. In order that the lever may be maintained in any desired position, an arch 58 is attached to the face of baffle 16, as plainly shown in the drawings. The arch may be secured by riveting, spot-welding, soldering, or in any other convenient manner. A longitudinal slot 60 extends through most of the length of the arch and is in alignment with the arc swept by lever 52 as it is rotated about shaft 44. The width of thumb screw 56 at the bottom is greater than the width of opening 60, so that when the thumb screw is screwed downwardly, it will engage the arch with sufficient frictional force to lock the lever 52 in any desired angular position with respect to the baffle.

This construction enables the center of gravity of the baffle and associated parts to be varied rapidly and accurately to meet particular draft conditions. When the weight 54 is set at any given position on lever 52, the center of gravity may be moved by loosening the thumb screw 56 and swinging the outer end of lever 52 up or down, thereby moving weight 54 away from or toward the back of baffle 16.

If further adjustment is desired, the location of weight 54 on lever 52 may be varied by rotating the weight so that it moves toward or away from shaft 44. Suitable gradations along the outer surface of arch 58 are incorporated, along with the letters H, M, and L, meaning high, medium, and low, so that the operator may readily set the regulator to an approximate operating position, or so that he may reset the regulator to an exact predetermined position.

Both forms of the invention are of simple mechanical construction, but at the same time provide the necessary accuracy of adjustment and permit easy maintenance of draft conditions that have been determined to result in satisfactory operation in connection with any particular stove installation.

It will be understood that the bearing supports for shafts 18 and 44 provide sufficiently small frictional resistance to enable the baffles to rotate under as low pressure draft conditions as will be encountered. The bearings as shown are only representative, and it will be understood that if improved bearings are required, they may be provided without departing from the invention.

While preferred forms of the invention have been shown and described, it is to be understood that the invention is not to be limited thereby, but only by the appended claims.

I claim:

1. A draft regulator comprising a supporting frame having an opening therethrough, a baffle substantially closing said opening and supported by pivotal means above its middle whereby said baffle may swing in said opening, a lever extending through said baffle and pivotally connected thereto to be movable in a generally vertical plane, a weight movable along said lever on one side of said baffle, and means associated with the other end of said lever for maintaining said lever in selected angular relation with said baffle.

2. A draft regulator comprising a supporting frame having an opening therethrough, a baffle substantially closing said opening and supported by pivotal means above its middle whereby said baffle may swing in said opening, a lever extending through said baffle and pivotally connected thereto, whereby said lever may move in a generally vertical plane, said lever bent in the form of a V, whereby when one end of said lever is substantially horizontal, the other end will extend at an upward angle, a weight movable on one end of said lever whereby the effective center of gravity of said baffle and lever may be varied toward or away from the plane of said baffle, and means associated with the other end of said lever whereby said lever may be maintained in selected angular relation to said baffle.

3. A draft regulator comprising a supporting frame having an opening therethrough, a baffle substantially closing said opening and supported by pivotal means above its middle whereby said baffle may swing in said opening, a lever extending through said baffle and pivotally related thereto, whereby said lever may move in a generally vertical plane, an adjustable weight on one end of said lever, a member movable along the other end of said lever, and co-operating means associated with one face of said baffle whereby said member may be brought into engagement therewith to maintain said lever in selected angular relation with respect to said baffle.

4. A draft regulator comprising a supporting frame having an opening therethrough, a baffle substantially closing said opening and supported by pivotal means above its middle whereby said baffle may swing in said opening, a lever extending through said baffle and pivotally connected thereto to be movable in a generally vertical plane, a weight movable along said lever on one side of said baffle, means associated with the other end of said lever for maintaining said lever in selected angular relation with said baffle, said means comprising a member threaded on the said other end of said lever for movement therealong, and an arch attached to said baffle and so located that it may be engaged by said member in all desired angular positions of said lever.

5. A draft regulator comprising a supporting frame having an opening therethrough, a baffle substantially closing said opening and supported by pivotal means above its middle whereby said baffle may swing in said opening, a lever extending through said baffle and pivotally connected thereto to be movable in a generally vertical plane, a weight movable along said lever on one side of said baffle, a member movable along the other end of said lever on the other side of said baffle, means for maintaining said weight at any position on said lever at which it may be set, an arch attached to the other side of said baffle and having a longitudinal opening, said arch so positioned that the other end of said lever extends through said opening, and means on the other end of said lever for permitting said member to be forced against said arch to maintain said lever in any desired position with respect to said baffle.

FRANK H. SCHNEIDER.

REFERENCES CITED

The following references are of record in the file of this patent:

UNITED STATES PATENTS

| Number | Name | Date |
| --- | --- | --- |
| 1,809,005 | Walker | June 9, 1931 |
| 2,194,608 | Miller | Mar. 26, 1940 |
| 2,251,440 | Cunningham | Aug. 5, 1941 |
| 2,289,579 | Klermund et al. | July 14, 1942 |
| 2,335,740 | Cole | Nov. 30, 1943 |